US007441746B2

(12) United States Patent
Sugiyama

(10) Patent No.: US 7,441,746 B2
(45) Date of Patent: Oct. 28, 2008

(54) SOLENOID DEVICE AND INJECTION VALVE HAVING THE SAME

(75) Inventor: Kouichi Sugiyama, Nagoya (JP)

(73) Assignee: Denso Corporation (JP)

( * ) Notice: Subject to any disclaimer, the term of this patent is extended or adjusted under 35 U.S.C. 154(b) by 3 days.

(21) Appl. No.: 11/653,347

(22) Filed: Jan. 16, 2007

(65) Prior Publication Data

US 2007/0176716 A1 Aug. 2, 2007

(30) Foreign Application Priority Data

Feb. 1, 2006 (JP) ............................ 2006-024465

(51) Int. Cl.
*F16K 31/02* (2006.01)

(52) U.S. Cl. .................. 251/129.15; 251/284; 335/261; 335/279; 335/281; 335/298

(58) Field of Classification Search ............ 251/129.15, 251/129.21, 284; 335/261–264, 279–280, 335/281, 296–298
See application file for complete search history.

(56) References Cited

U.S. PATENT DOCUMENTS

| | | | | |
|---|---|---|---|---|
| 2,407,963 | A * | 9/1946 | Persons | 335/261 |
| 3,082,359 | A * | 3/1963 | Mangiafico et al. | 335/261 |
| 3,168,242 | A * | 2/1965 | Diener | 335/261 |
| 3,348,178 | A * | 10/1967 | Erickson et al. | 335/281 |
| 4,569,504 | A * | 2/1986 | Doyle | 251/129.15 |
| 5,544,857 | A * | 8/1996 | Torrence | 251/129.15 |
| 5,732,888 | A * | 3/1998 | Maier et al. | 251/129.15 |
| 5,775,670 | A * | 7/1998 | Osterbrink | 251/129.15 |
| 6,467,495 | B2 * | 10/2002 | Shost | 251/129.15 |
| 6,853,276 | B2 * | 2/2005 | Smith | 335/281 |
| 2003/0107016 | A1 * | 6/2003 | Burrola et al. | 251/129.15 |
| 2004/0178378 | A1 * | 9/2004 | Collins et al. | 251/129.15 |

FOREIGN PATENT DOCUMENTS

| | | |
|---|---|---|
| EP | 1 754 882 | 2/2007 |
| JP | 2002-310029 | 10/2002 |
| JP | 2004-293523 | 10/2004 |
| JP | 2005-069410 | 3/2005 |

OTHER PUBLICATIONS

German Office Action dated Mar. 27, 2008 issued in corresponding German Application No. 10 2007 000 062.8 with English translation.

* cited by examiner

*Primary Examiner*—John Bastianelli
(74) *Attorney, Agent, or Firm*—Nixon & Vanderhye PC

(57) ABSTRACT

An injection valve includes a housing that movably accommodates a needle. A movable core is axially movable together with the needle in the housing. A stationary core is fixed in the housing for forming a magnetic circuit together with the movable core. At least one of the movable core and the stationary core has an end that has an annular first protrusion protruding toward an end of an other of the movable core and the stationary core. At least one of the movable core and the stationary core has an end that has an annular second protrusion protruding toward an end of an other of the movable core and the stationary core. The first protrusion is substantially coaxial with respect to the second protrusion.

8 Claims, 5 Drawing Sheets

SOLENOID DEVICE AND INJECTION VALVE HAVING THE SAME

CROSS REFERENCE TO RELATED APPLICATIONS

This application is based on and incorporates herein by reference Japanese Patent Application No. 2006-24465 filed on Feb. 1, 2006.

FIELD OF THE INVENTION

The present invention relates to a solenoid device and an injection valve having the solenoid device.

BACKGROUND OF THE INVENTION

According to U.S. Pat. No. 5,732,888 (JP-A-08-506876), a fuel injection valve includes a needle that axially moves integrally with a movable core by being electromagnetically operated. A coil of the fuel injection valve is supplied with electricity, so that the movable core and a stationary core generate magnetic attractive force therebetween. In this structure, the movable core and the needle integrally move toward the stationary core, so that a contact surface, which is defined on an axial end of the movable core, makes contact with a contact surface, which is defined on an axial end of the stationary core.

When supplying electricity to the coil is terminated, a biasing member such as a spring moves the movable core and the needle integrally toward a valve seat on the opposite side of the stationary core, so that the contact surfaces are separated from each other.

The contact surfaces of the cores cause a squeeze effect therebetween, immediately after terminating electricity supplied to the coil so that the contact surfaces of the cores start separating from each other. The squeeze effect disturbs movement of the movable core. In this condition, fuel hard to flow into the gap between the contact surfaces. As a result, response of the fuel injection valve becomes low with respect to the termination of electricity. Consequently, a period, which is between terminating electricity to the coil and starting fuel spray from the fuel injection valve, becomes long.

In the structure of U.S. '888, the fuel injection valve includes cores each having an end partially defining a protrusion. In this structure, the force caused by squeeze effect can be reduced, compared with a structure in which each end of both cores entirely defines a substantially flat contact surface. However, when the protrusion is simply defined in the structure of U.S. '888, magnetic flux for generating attractive force is concentrated to the protrusion defined in the axial end. The contact surface defined in the protrusion is less than the entire surface of the axial end of the core. Accordingly, magnetic flux concentrated to the protrusion is saturated at low level. Furthermore, in U.S. '888, each axial end of both of the cores has a non-contact surface, in which the protrusion is not defined. The non-contact surface defines a gap when the cores make contact with each other, and consequently, magnetic flux is reduced between the cores. Accordingly, magnetic attractive force decreases due to reduction in magnetic flux in the axial end of the core, compared with the structure, in which the axial ends entirely define contact surfaces. As a result, response of the fuel injection valve becomes low when the coil is supplied with electricity.

SUMMARY OF THE INVENTION

In view of the foregoing and other problems, it is an object of the present invention to produce a solenoid device that is adapted to generating enhanced magnetic flux therein. It is another object of the present invention to produce an injection valve having the solenoid device.

According to one aspect of the present invention, an injection valve includes a housing that defines a fluid passage therein. The housing has a valve seat. The injection valve further includes a needle that is provided in the housing. The needle blocks the fluid passage when the needle is seated to the valve seat. The needle communicates the fluid passage when the needle is lifted from the valve seat. The injection valve further includes a movable core that is provided in the housing. The movable core is axially movable together with the needle. The injection valve further includes a stationary core that is fixed in the housing. The stationary core forms a magnetic circuit together with the movable core. At least one of the movable core and the stationary core has an end that has a first protrusion protruding toward an end of an other of the movable core and the stationary core. The first protrusion is in a substantially annular shape. The first protrusion has a first protruding end that is adapted to making contact with the other of the movable core and the stationary core. At least one of the movable core and the stationary core has an end that has a second protrusion protruding toward an end of an other of the movable core and the stationary core. The second protrusion is in a substantially annular shape. The second protrusion has a second protruding end that is adapted to making contact with the other of the movable core and the stationary core. The first protrusion is substantially coaxial with respect to the second protrusion.

According to another aspect of the present invention, a solenoid device includes a housing. The solenoid device further includes a movable core that is axially movable in the housing. The solenoid device further includes a stationary core that is fixed in the housing for constructing a magnetic circuit together with the movable core. The movable core is axially opposed to the stationary core. At least one of the movable core and the stationary core has a first protrusion, which is in a substantially annular shape, axially protruding and adapted to making contact with opposed one of the movable core and the stationary core. At least one of the movable core and the stationary core has a second protrusion, which is in a substantially annular shape, axially protruding and adapted to making contact with opposed one of the movable core and the stationary core. The first protrusion is substantially coaxial with respect to the second protrusion.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
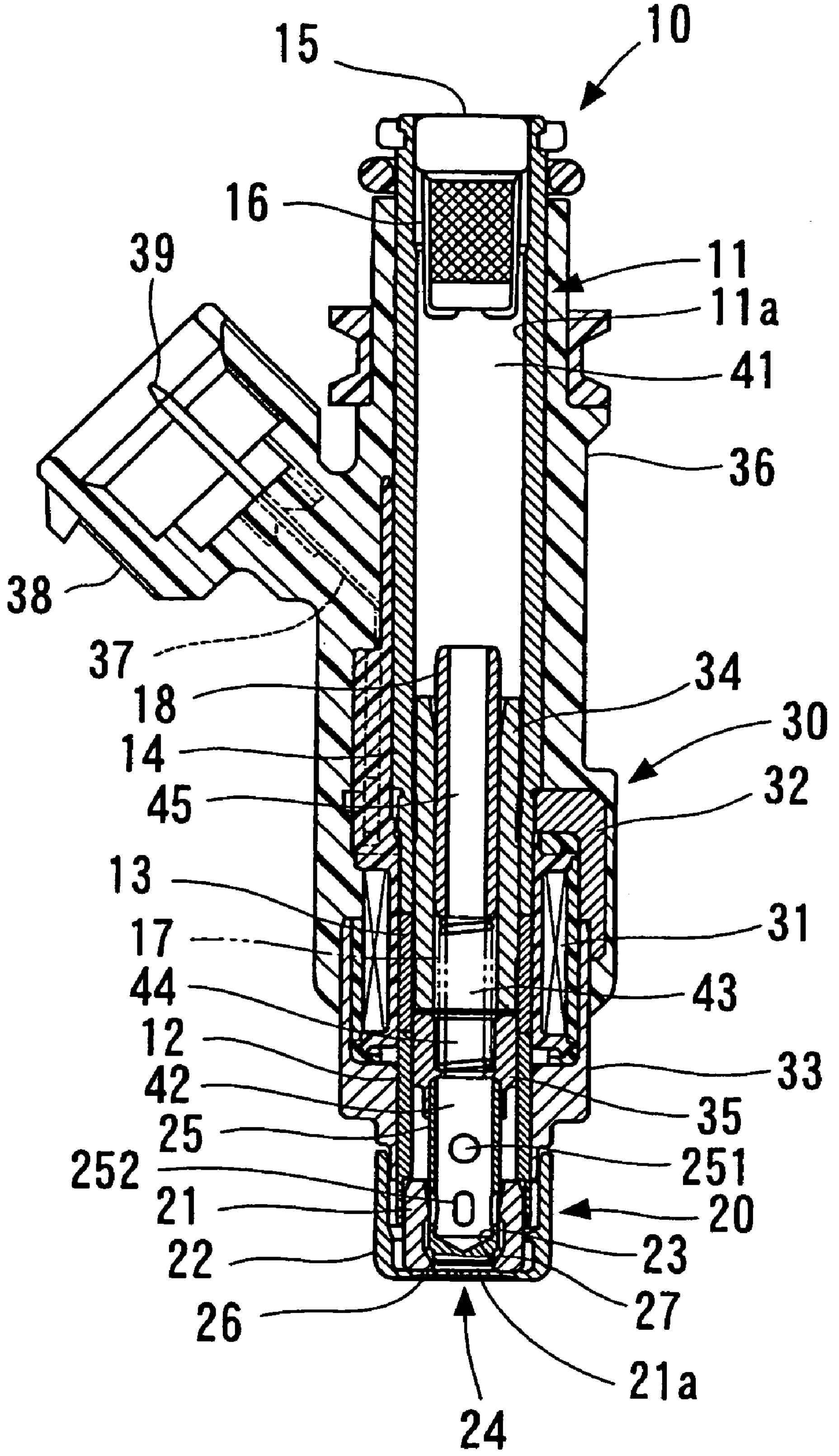
FIG. 1 is a sectional view showing an injector according to a first embodiment.
Figure 2:
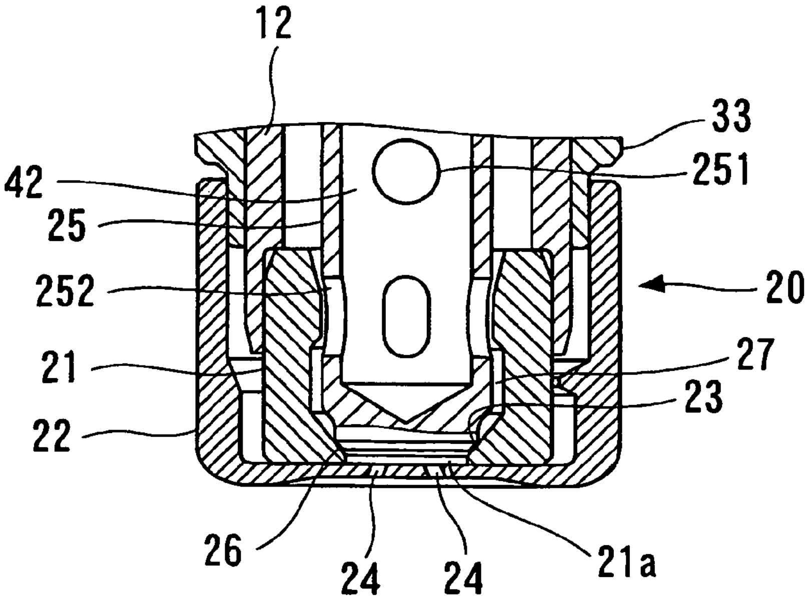
FIG. 2 is an enlarged sectional side view showing a nozzle of the injector.

An injector 10 shown in FIGS. 1, 2 is provided to an internal combustion engine such as a gasoline engine for injecting fuel into intake air drawn into a combustion chamber of the engine. The injector 10 may be provided to a direct-injection gasoline engine, in which fuel is directly injected into a combustion chamber. Alternatively, the injector 10 may be provided to a diesel engine. A fuel injection apparatus is constructed of the injector 10, an unillustrated delivery pipe, and the like. Fuel is supplied to the injector 10 through the delivery pipe.

The injector 10 includes an accommodating pipe 11 that has a thin wall constructing a substantially cylindrical member. The accommodating pipe 11 includes a first magnetic portion 12, a non-magnetic portion 13, and a second magnetic portion 14. The non-magnetic portion 13 restricts the first magnetic portion 12 and the second magnetic portion 14 from causing magnetic short circuit therebetween. The accommodating pipe 11 has one end defining a fuel inlet 15. Fuel is supplied from an unillustrated fuel pump into the fuel inlet 15. Fuel supplied into the fuel inlet 15 flows into a fuel passage 41 through a filter 16. The fuel passage 41 is defined on the radially inner side of the accommodating pipe 11. The filter 16 is provided to the one end of the accommodation pipe 11 for removing foreign matters contained in fuel.

The accommodating pipe 11 has the other end on the opposite side of the fuel inlet 15. The other end of the accommodating pipe 11 corresponds to an end of the first magnetic portion 12. The other end of the accommodating pipe 11 is provided with a nozzle 20. The nozzle 20 includes a valve body 21 and a nozzle plate 22. The valve body 21 is in a substantially cylindrical shape. The valve body 21 is fixed to the inner circumferential periphery of the first magnetic portion 12. The valve body 21 has a tip end on the opposite side of the fuel inlet 15. The tip end of the valve body 21 has an opening 21*a*. The valve body 21 has a substantially conical inner circumferential periphery that reduces in inner diameter thereof toward the opening 21*a*. The inner circumferential periphery of the valve body 21 defines a valve seat 23. The nozzle plate 22 is arranged on the opposite side of the accommodating pipe 11 with respect to the valve body 21. The nozzle plate 22 has nozzle holes 24 each communicating the inner wall on the side of the valve seat 23 with the outer wall on the opposite side of the valve seat 23.

The needle 25 is axially movable around the inner circumferential periphery of the first magnetic portion 12 and the valve body 21. The needle 25 is substantially coaxial with respect to both the accommodating pipe 11 and the valve body 21. The needle 25 has an end in the vicinity of the nozzle plate 22. The end of the needle 25 defines a seal portion 26. The seal portion 26 is adapted to being seated onto the valve seat 23 defined in the valve body 21. The needle 25 and the valve body 21 define a fuel passage 27 therebetween. Fuel passes through the fuel passage 27. The seal portion 26 of the needle 25 is lifted from the valve seat 23, so that the fuel passage 27 communicates with the nozzle holes 24. In this embodiment, the needle 25 is in a substantially cylindrical shape. The needle 25 has the inner circumferential periphery that defines a fuel passage 42 therein. The needle 25 has holes 251, 252 through which the fuel passage 42 communicates with the fuel passage 27. The needle 25 is not limited to be in a substantially cylindrical shape. The needle 25 may be a substantially solid column in shape.

The injector 10 includes a driving portion 30. The driving portion 30 is operated using a solenoid device, i.e., electromagnetic device. The driving portion 30 includes a coil 31, a plate 32, a holder 33, a stationary core 34, and a movable core 35. The plate 32 and the holder 33 are formed of a magnetic material. The plate 32 surrounds the outer circumferential periphery of the coil 31. The holder 33 is arranged around the outer circumferential periphery of the accommodating pipe 11, such that the holder 33 supports the coil 31 from the side of the nozzle holes 24. The plate 32 and the holder 33 are formed of a magnetic material, and are magnetically connected. The outer circumferential peripheries of the coil 31, the plate 32, the holder 33, and the accommodating pipe 11 are surrounded by a resin mold 36. The coil 31 electrically connects with a terminal 39 via a wiring member 37. The terminal 39 is provided to a connector 38. The accommodating pipe 11, which is in a substantially cylindrical shape, the valve body 21, the driving portion 30, which is provided around the outer circumferential peripheries of both the accommodating pipe 11 and the valve body 21, and the resin mold 36, which surrounds the driving portion 30, the accommodating pipe 11, and the valve body 21, construct a housing. The housing defines the fuel passage therein.

The stationary core 34 is fixed on the radially inner side of the coil 31 via the accommodating pipe 11. The stationary core 34 is formed of a magnetic material such as a ferrous material to be in a substantially cylindrical shape. The stationary core 34 has the inner circumferential periphery that defines a fuel passage 43. The stationary core 34 and the movable core 35 define a predetermined gap therebetween. The gap between the stationary core 34 and the movable core 35 corresponds to a lift of the needle 25.

The movable core 35 is received on the radially inner side of the accommodating pipe 11. The movable core 35 is axially movable in the radially inner side of the accommodating pipe 11. The movable core 35 has an end on the opposite side of the nozzle plate 24. The end of the movable core 35, which is on the opposite side of the nozzle plate 24, is opposed to the stationary core 34. The movable core 35 is formed of a magnetic material such as a ferrous material to be in a substantially cylindrical shape. The movable core 35 has the inner circumferential periphery that defines a fuel passage 44. The needle 25 has an end on the opposite side of the seal portion 26. The end of the needle 25, which is on the opposite side of the seal portion 26, is fixed to the inner circumferential periphery of the movable core 35. In this structure, the needle 25 is axially movable integrally with the movable core 35.

The seal portion 26 is seated onto the valve seat 23, so that the needle 25 and the movable core 35, which are integrated with each other, are restricted from further moving toward the nozzle holes 24. The needle 25 and the movable core 35, which are integrated with each other, move to the opposite side of the nozzle holes 24, so that the movable core 35 makes contact with the stationary core 34. Thus, the needle 25 and the movable core 35, which are integrated with each other, are restricted from further moving toward the stationary core 34. In this structure, the stationary core 34 serves as a stopper for restricting the needle 25 and the movable core 35, which are integrated with each other, from further moving toward the stationary core 34.

The movable core 35 makes contact with a spring 17 that serves as a biasing member. The biasing member is not limited to the spring 17. The biasing member may be any other resilient member such as a blade spring, an oil damper, and an air damper. The spring 17 has one axial end that makes contact with the movable core 35. The spring 17 has the other axial end that makes contact with an adjusting pipe 18. The adjusting pipe 18 is fixed to the inner circumferential periphery of the stationary core 34. The spring 17 is axially extendable. The spring 17, which is fixed at one end thereof, biases the integrated needle 25 and the movable core 35 onto the valve seat 23 at the other end thereof. The spring 17 generates biasing force that is adjusted corresponding to the length by which the adjusting pipe 18 is press-inserted into the stationary core 34. When the coil 31 is not supplied with electricity, the integrated needle 25 and the movable core 35 are biased toward the valve seat 23. Thus, the seal portion 26 is seated onto the valve seat 23. The adjusting pipe 18 is in a substantially cylindrical shape. The adjusting pipe 18 has the inner circumferential periphery that defines a fuel passage 45 therein.

Fuel flows into the filter 16 through the fuel inlet 15, and the fuel further flows into the fuel passage 27 after passing through the fuel passages 41, 45, 43, 44, 42 and the holes 251, 252. The fuel passages 41, 45, 43, 44, 42 are respectively defined in the accommodating pipe 11, the adjusting pipe 18, the stationary core 34, the movable core 35, and the needle 25.

Figure 3:
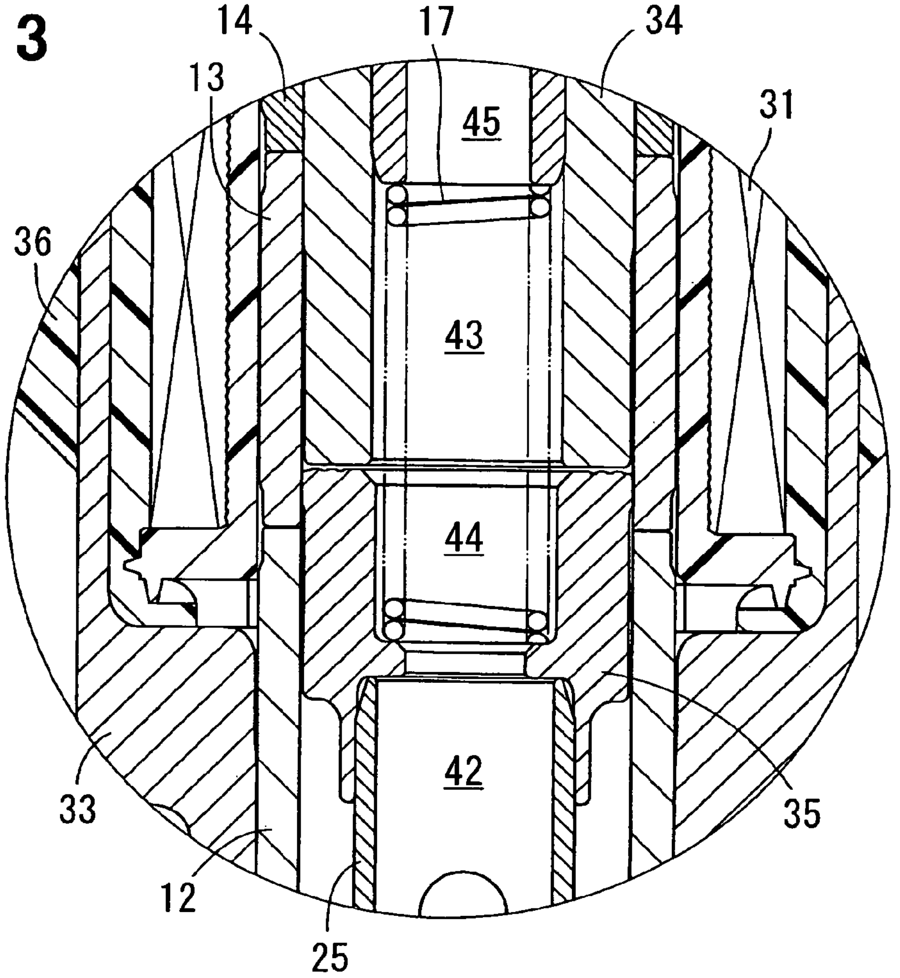
FIG. 3 is an enlarged sectional side view showing a movable core and a stationary core of the injector.
Figure 4:
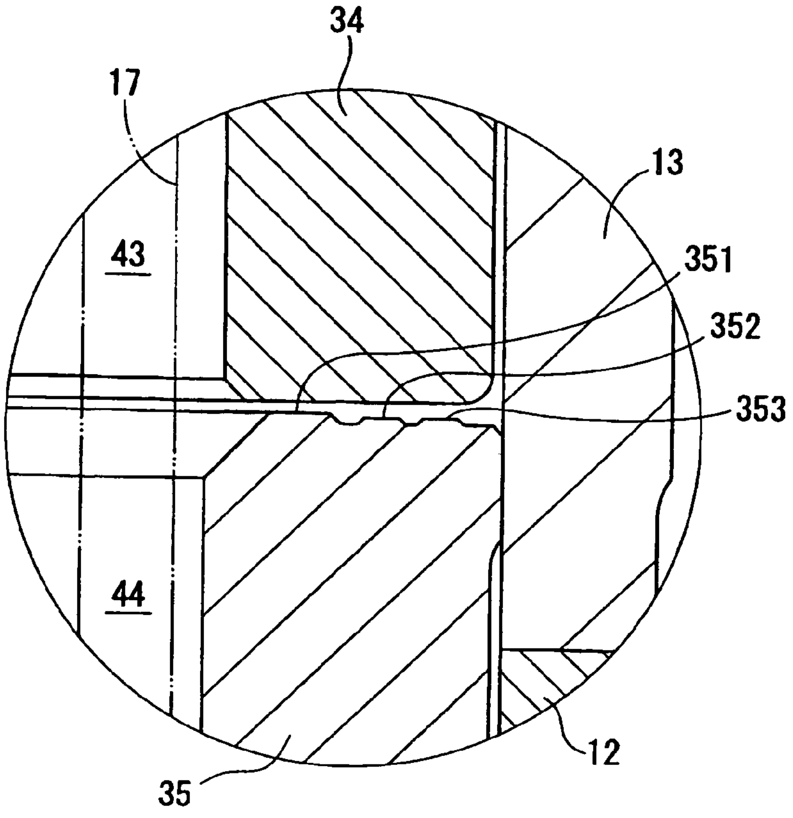
FIG. 4 is an enlarged sectional side view showing contact surfaces of the movable core and the stationary core.

Next, the contact surfaces of the movable core 35 and the stationary core 34 are described in reference to FIGS. 3, 4.

The movable core 35 has one axial end that defines a first protrusion 351 protruding toward the stationary core 34. The first protrusion 351 has a protruding end that is adapted to making contact with one end of the stationary core 34. The first protrusion 351 is in a substantially annular shape, and substantially circumferentially extends around the axis of the movable core 35. The protruding end of the first protrusion 351 is applied with hard plating that has the surface defining the contact surface via which the first protrusion 351 makes contact with the stationary core 34. The movable core 35 is enhanced in ablation resistance against the stationary core 34 by being applied with the hard plating. The first protrusion 351 is provided to the radially inner end in the axial end of the movable core 35.

The axial end of the movable core 35 defines a non-contact portion that does not make contact with the stationary core 34. The non-contact portion of the movable core 35 has multiple second protrusions 352, 353 each protruding toward the axial end of the stationary core 34. Each of the second protrusions 352, 353 is in a substantially annular shape, and substantially circumferentially extends around the axis of the movable core 35.

The first protrusion 351, and the second protrusions 352, 353 are substantially coaxial relative to each other. The first protrusion 351 is located on the radially inner side on the left side in FIG. 4 in the axial end of the movable core 35. The second protrusion 353 is located on the radially outer side on the right side in FIG. 4 in the axial end of the movable core 35. Each of the second protrusions 352, 353 protrudes by each protruding height that is less than a first protruding height by which the first protrusion 351 protrudes. In this structure, as shown in FIG. 5C, when the first protrusion 351 makes contact with the stationary core 34, the second protrusions 352, 353 and the stationary core 34 define a gap t1 therebetween.

The protruding height (second protruding height) of the second protrusion 352 is substantially the same as the protruding height (second protruding height) of the second protrusion 353, for example. The area of a protruding end (second protruding end) of the second protrusion 352 is substantially the same as the area of a protruding end (second protruding end) of the second protrusion 353, for example. The area of the protruding end of the second protrusion 352 is less than the area of a first protruding end of the first protrusion 351, for example.

In this embodiment, the axial end of the stationary core 34 does not have a protrusion such as the first and second protrusions 351, 352, 353. The axial end of the stationary core 34 is substantially flat, and extends perpendicularly to the axial direction of the stationary core 34. The axial end of the stationary core 34 is applied with hard plating, similarly to the axial end of the movable core 35. The stationary core 34 is enhanced in ablation resistance against the movable core 35 by being applied with the hard plating.

Next, an operation of the injector 10 is described.

When supplying electricity to the coil 31 is terminated, the stationary core 34 and the movable core 35 do not generate magnetic attractive force therebetween. In this condition, the spring 17 biases the integrated needle 25 and the movable core 35 toward the valve body 21. Therefore, the integrated needle 25 and the movable core 35 move toward the valve body 21, so that the seal portion 26 is seated onto the valve seat 23. Thus, the fuel passage 27 and the nozzle holes 24 are blocked from each other, so that fuel is not sprayed through the nozzle holes 24.

When the coil 31 is supplied with electricity, the coil 31 generates magnetic field, so that the second magnetic portion 14, the stationary core 34, the movable core 35, the first magnetic portion 12, the holder 33, and the plate 32 construct a magnetic circuit thereamong. Thus, the stationary core 34 and the movable core 35 generate magnetic attractive force therebetween. The magnetic attractive force draws the movable core 35 toward the stationary core 34. When the magnetic attractive force becomes greater than the biasing force of the spring 17, the integrated needle 25 and the movable core 35 move toward the stationary core 34. The integrated needle 25 and the movable core 35 move toward the stationary core 34 until the first protrusion 351 makes contact with the stationary core 34. The seal portion 26 is lifted from the valve seat 23, as the integrated needle 25 and the movable core 35 move toward the stationary core 34. Thus, the fuel passage 27 communicates with the nozzle holes 24 through the opening 21*a*, so that fuel is sprayed through the nozzle holes 24 in this valve opening condition.

When supplying electricity to the coil 31 is terminated, the magnetic attractive force between the stationary core 34 and the movable core 35 disappears. In this condition, the contact surface (movable side contact surface) of the first protrusion 351 departs from the contact surface (stationary side contact surface), so that the spring 17 biases, i.e., urges the integrated needle 25 and the movable core 35 toward the valve body 21. Therefore, the integrated needle 25 and the movable core 35 move toward the valve body 21. Thus, the integrated needle 25 and the movable core 35 move toward the valve body 21 until the seal portion 26 is seated onto the valve seat 23. When the seal portion 26 is seated onto the valve seat 23, the fuel passage 27 and the nozzle holes 24 are blocked from each other, so that fuel is not sprayed through the nozzle holes 24 in this valve closing condition.

As described above, the integrated needle 25 and the movable core 35 move toward the stationary core 34 by supplying electricity to the coil 31, so that the first protrusion 351 of the movable core 35 collides against the stationary core 34. The integrated needle 25 and the movable core 35 move toward the valve body 21 by terminating the electricity supply to the coil 31, so that the needle 25 collides against the valve body 21. The integrated needle 25 and the movable core 35 repeat collision against either the valve body 21 or the stationary core 34 by supplying electricity to the coil 31 and terminating the electricity supply to the coil 31.

Figure 5A:
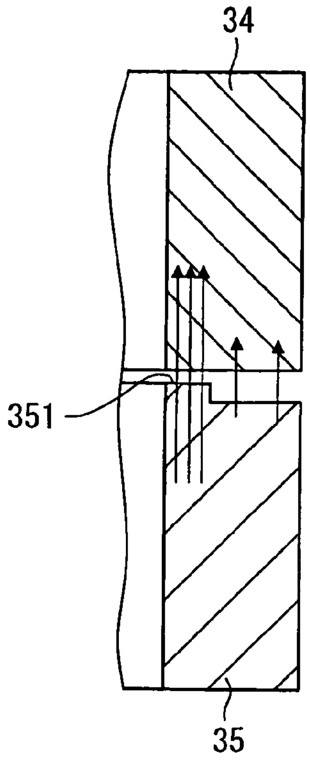
FIG. 5A is a sectional view showing contact surfaces of a movable core and a stationary core according to a comparable example.

In a comparative example shown in FIG. 5A, a movable core 35 does not have second protrusions 352, 353. In this structure, when the first protrusion 351 makes contact with the stationary core 34, the stationary core 34 and the movable core 35 define a gap t2, shown in FIG. 5C, therebetween. Accordingly, the magnetic flux for generating the magnetic attractive force is concentrated in the first protrusion 351 that defines the contact surface. Consequently, magnetic flux passing through a non-contact portion, which does not make contact with the stationary core 34, becomes small in the movable core 35. As a result, an effective area through which magnetic flux passes becomes small relative to a total opposed area, via which the movable core 35 is opposed to the stationary core 34, in the axial end of the movable core 35. Consequently, the magnetic attractive force decreases, and the response of the needle 25 becomes low when the coil 31 is supplied with electricity to be in the valve opening condition, in the comparative example shown in FIG. 5A.

Figure 5B:
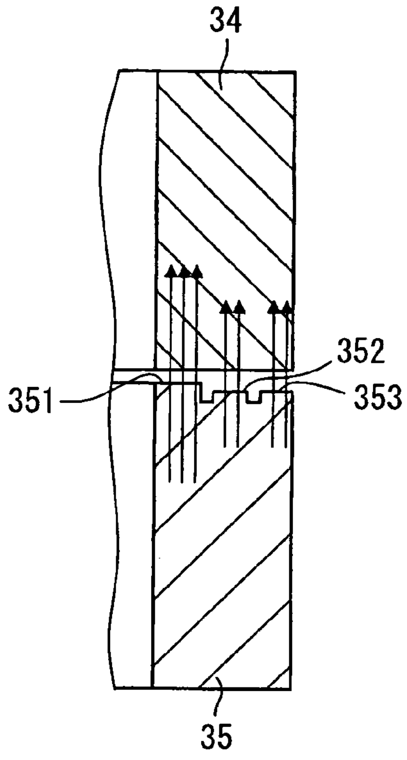
FIGS. 5B, 5C are sectional views showing the contact surfaces of the movable core and the stationary core according to the first embodiment.
Figure 5C:
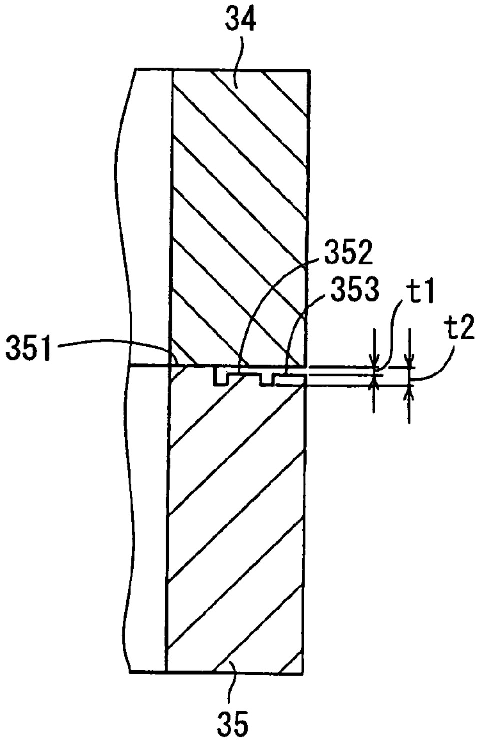

By contrast, in the structure of this embodiment, as shown in FIGS. 5B, 5C, when the first protrusion 351 makes contact with the stationary core 34 (FIG. 5C), the stationary core 34 and the movable core 35 define the gap t1 therebetween. The gap t1 is less than the gap t2. Therefore, as shown in FIG. 5B, the magnetic flux passing through the non-contact portion of the movable core 35, which does not make contact with the stationary core 34, increases compared with the comparative example shown in FIG. 5A. The magnetic attractive force applied between the stationary core 34 and the movable core 35 can be totally enhanced, so that the response of the needle 25 becomes high when the coil 31 is supplied with electricity to be in the valve opening condition.

In the above structure, when the protruding height of each of the second protrusions 352, 353 is determined such that the second protrusions 352, 353 make contact with the stationary core 34, the magnetic attractive force may be enhanced. However, in this structure, the contact surface between the movable core 35 and the stationary core 34 increases in total area. Accordingly, when supplying electricity to the coil 31 is terminated, and the contact surface of the stationary core 34 starts departing from the contact surface of the movable core 35, the force caused by the squeeze effect increases between the contact surfaces of the stationary core 34 and the movable core 35. In this condition, the force, which disturbs the movable core 35 from moving to be in the valve opening condition, becomes large.

By contrast, in this embodiment, the contact area between the second protrusions 352, 353 and the stationary core 34 is regulated, in particular, by defining the protruding length of the second protrusions 352, 353. In this structure, the magnetic flux passing through the non-contact portion of the movable core 35 can be enhanced, while the contact area of the movable core 35 relative to the stationary core 34 is restricted from increasing. Thus, response of the fuel injection valve can be enhanced in the valve closing condition, and furthermore, response of the fuel injection valve in the valve opening condition can be also enhanced when the coil 31 is supplied with electricity.

Furthermore, in this embodiment, the second protrusions 352, 353 are substantially coaxial with respect to the first protrusion 351, and are substantially annular. Therefore, a gap-reduced area, in which the gap is reduced between the movable core 35 and the stationary core 34, is circumferentially defined substantially in uniform. In this structure, the magnetic attractive force becomes substantially in uniform relative to the circumferential direction, so that the magnetic attractive can be stabilized. In addition, each of the second protrusions 352, 353 annularly extends so that the magnetic flux passing through the non-contact portion of the movable core 35 can be enhanced, compared with a structure in which at least one of the second protrusions 352, 353 discontinuously extends in the circumferential direction, for example.

Second Embodiment

Figure 6:
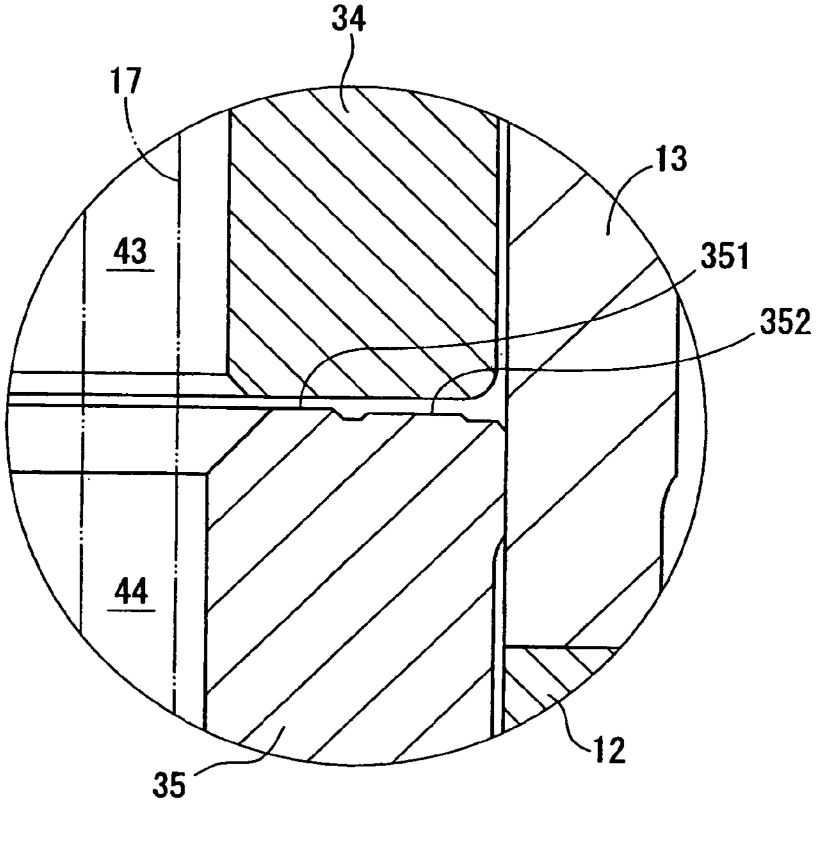
FIG. 6 is a sectional view showing contact surfaces of a movable core and a stationary core, according to a second embodiment.

As shown in FIG. 6, the second protrusion 353 in the first embodiment is omitted from the axial end of the movable core 35, and the second protrusion 352 is provided to the axial end of the movable core 35. In this embodiment, the area of the protruding end of the second protrusion 352 may be greater than the area of the protruding end of the first protrusion 351, for example.

Third Embodiment

Figure 7:
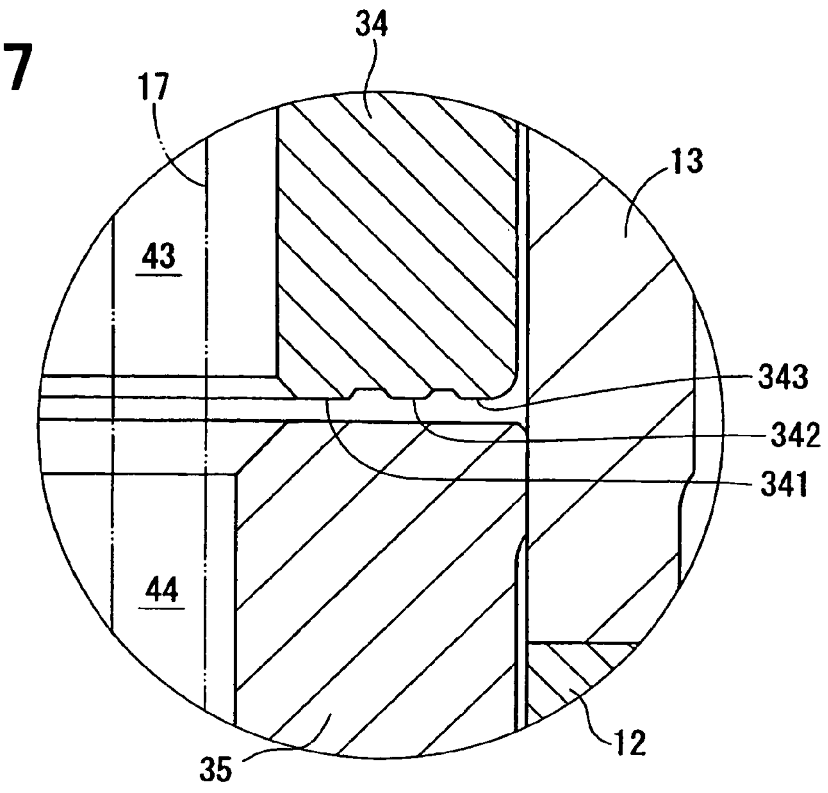
FIG. 7 is a sectional view showing contact surfaces of a movable core and a stationary core, according to a third embodiment.

As shown in FIG. 7, a first protrusion 341 and second protrusions 342, 343 are provided to the axial end of the stationary core 34.

Fourth Embodiment

Figure 8:
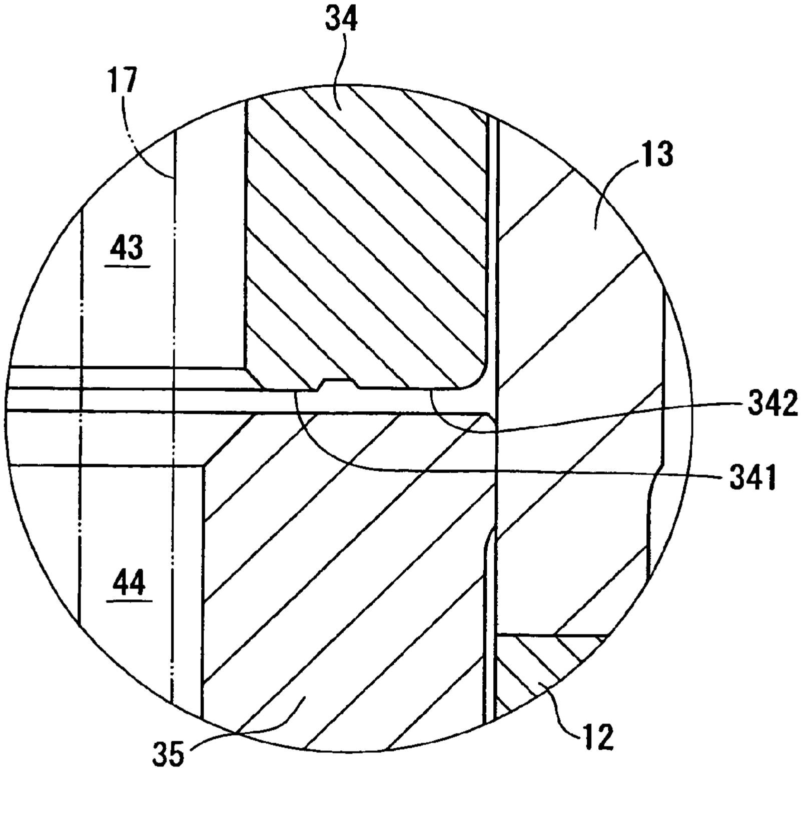
FIG. 8 is a sectional view showing contact surfaces of a movable core and a stationary core, according to a fourth embodiment.

As shown in FIG. 8, the second protrusion 343 in the third embodiment is omitted from the axial end of the stationary core 34, and the second protrusion 342 is provided to the axial end of the stationary core 34. In this embodiment, the area of the protruding end of the second protrusion 342 may be greater than the area of the protruding end of the first protrusion 341, for example.

Other Embodiment

At least one of the second protrusions 342, 343, 352, 353 may be provided to one of the movable core 35 and the stationary core 34 on the opposite side of the other of the movable core 35 and the stationary core 34 to which the first protrusion 341, 351 is provided.

At least one of the first and second protrusions 341, 351, 342, 343, 352, 353 may be provided to both the movable core 35 and the stationary core 34.

At least one of the second protrusions 342, 343, 352, 353 provided to one of the movable core 35 and the stationary core 34 may make contact with the other of the movable core 35 and the stationary core 34, similarly to the first protrusion 341, 351.

Fuel is an example of fluid used in the injection valve. The fluid used in the injection valve may be any other fluidic substance.

In the above embodiments, the solenoid device is used in the fuel injection valve. However, the solenoid device is not limited to application to a fuel injection valve. The solenoid device can be used for any other electromagnetic devices.

Summarizing the above embodiment, the solenoid device 30 includes the housing 11, 21, 30, 36. The solenoid device 30 further includes the movable core (35) that is axially movable in the housing 11, 21, 30, 36. The solenoid device 30 further includes the stationary core 34 that is fixed in the housing 11, 21, 30, 36 for constructing a magnetic circuit together with the movable core 35. The movable core 35 is axially opposed to the stationary core 34. At least one of the movable core 35 and the stationary core 34 has the first protrusion 341, 351, which is in a substantially annular shape, axially protruding and adapted to making contact with opposed one of the movable core 35 and the stationary core 34. At least one of the movable core 35 and the stationary core 34 has the second protrusion 342, 352, 353, which is in a substantially annular shape, axially protruding and adapted to making contact with opposed one of the movable core 35 and the stationary core 34. The first protrusion 341, 351 is substantially coaxial with respect to the second protrusion 342, 352, 353. In the above embodiments, the solenoid device (30) is applied to the injection valve, as an example.

Various modifications and alternations may be diversely made to the above embodiments without departing from the spirit of the present invention.

What is claimed is:

1. An injection valve comprising:

a housing that defines a fluid passage therein, the housing having a valve seat;

a needle that is provided in the housing, the needle blocking the fluid passage when the needle is seated to the valve seat, the needle communicating the fluid passage when the needle is lifted from the valve seat;

a movable core that is provided in the housing, the movable core being axially movable together with the needle; and a stationary core that is fixed in the housing, the stationary core forming a magnetic circuit together with the movable core, wherein at least one of the movable core and the stationary core has an end that has a first protrusion protruding toward an end of an other of the movable core and the stationary core, the first protrusion is in a substantially annular shape, the first protrusion has a first protruding end that is adapted to making contact with the other of the movable core and the stationary core, at least one of the movable core and the stationary core has an end that has a second protrusion protruding toward an end of an other of the movable core and the stationary core, the second protrusion is in a substantially annular shape, the first protrusion is substantially coaxial with respect to the second protrusions, the first protrusion protrudes by a first protruding height, the second protrusion protrudes by a second protruding height, and the second protruding height is less than the first protruding height, the second protrusion and the end of the other of the movable core and the stationary core define a gap therebetween in a condition in which the first protrusion makes contact with the end of the other of the movable core and the stationary core, and the first protruding end is in parallel with a surface of the end of the other of the movable core and the stationary core wherein one of the movable core and the stationary core has both the first protrusion and the second protrusion, and the first protrusion and the second protrusion define an annular groove therebetween.

2. The injection valve according to claim 1, wherein the second protrusion includes a plurality of second protrusions.

3. The injection valve according to claim 1, wherein the movable core is axially opposed to the stationary core, the first protrusion protrudes toward opposed one of the movable core and the stationary core, and the second protrusion protrudes toward opposed one of the movable core and the stationary core.

4. A solenoid device comprising:

a housing;

a movable core that is axially movable in the housing; and a stationary core that is fixed in the housing for constructing a magnetic circuit together with the movable core, wherein the movable core is axially opposed to the stationary core, at least one of the movable core and the stationary core has a first protrusion, which is in a substantially annular shape, axially protruding and adapted to making contact with opposed one of the movable core and the stationary core, at least one of the movable core and the stationary core has a second protrusion, which is in a substantially annular shape, axially protruding, and the first protrusion is substantially coaxial with respect to the second protrusion, the first protrusion protrudes by a first protruding height, the second protrusion protrudes by a second protruding height, the second protruding height is less than the first protruding height, the second protrusion and an opposed one of the movable core and the stationary core define a gap therebetween in a condition in which the first protrusion makes contact with the opposed one of the movable core and the stationary core, and the first protruding end is in parallel with a surface of the end of the opposed one of the movable core and the stationary core wherein one of the movable core and the stationary core has both the first protrusion and the second protrusion, and the first protrusion and the second protrusion define an annular groove therebetween.

5. The solenoid device according to claim 4, wherein the second protrusion includes a plurality of second protrusions.

6. An injection valve comprising:

the solenoid device according to claim 4; and a needle that is provided in the housing, wherein the housing defines a fluid passage therein, the housing has a valve seat, the needle is axially movable together with the movable core, the needle blocks the fluid passage when the needle is seated to the valve seat, and the needle communicates the fluid passage when the needle is lifted from the valve seat.

7. The injection valve according to claim 1, wherein the first protrusion is radially inside of the second protrusion.

8. The solenoid device according to claim 4, wherein the first protrusion is radially inside of the second protrusion.

* * * * *